E. SACHS.
FREE WHEEL GEAR WITH BACK PEDALING BRAKE.
APPLICATION FILED MAR. 18, 1911.

1,014,180.

Patented Jan. 9, 1912.
2 SHEETS—SHEET 1.

Witnesses
R. H. Bishop
J. Austin Stone

Inventor
Ernst Sachs
By Julian C. Dowell
his atty

E. SACHS.
FREE WHEEL GEAR WITH BACK PEDALING BRAKE.
APPLICATION FILED MAR. 18, 1911.
1,014,180.
Patented Jan. 9, 1912.
2 SHEETS—SHEET 2.
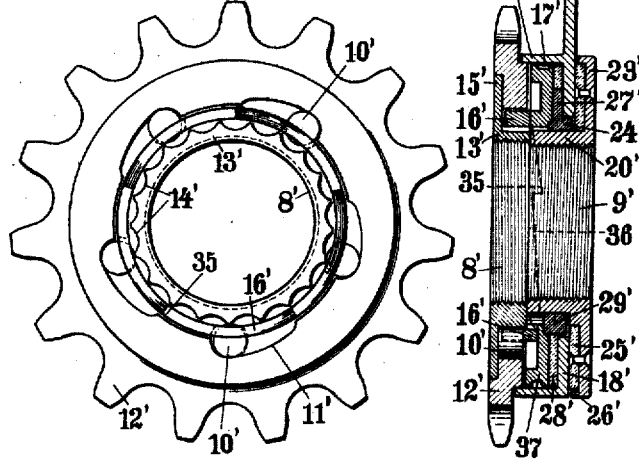
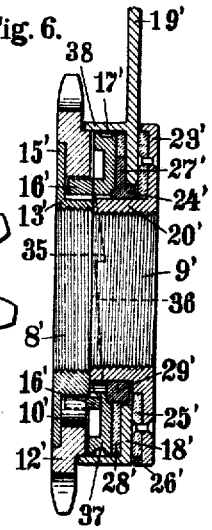
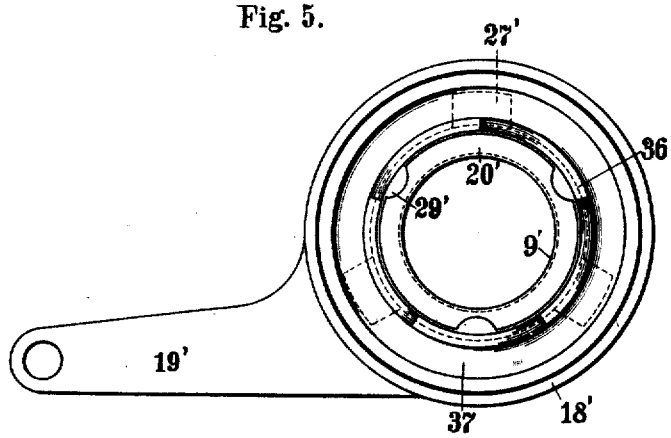
Witnesses
R. W. Bishop
J. Austin Stone
Inventor
Ernst Sachs
By Julius A. Dowell
his atty

UNITED STATES PATENT OFFICE.

ERNST SACHS, OF SCHWEINFURT, GERMANY.

FREE-WHEEL GEAR WITH BACK-PEDALING BRAKE.

1,014,180.  Specification of Letters Patent.  Patented Jan. 9, 1912.

Application filed March 18, 1911. Serial No. 615,410.

*To all whom it may concern:*

Be it known that I, ERNST SACHS, a subject of the King of Bavaria, residing at No. 23 Schultesstrasse, Schweinfurt, in Germany, have invented new and useful Improvements in Free-Wheel Gears with Back-Pedaling Brake, of which the following is a specification.

The invention relates to a free-wheel mechanism for cycles combined with a brake appliance capable of being applied by backward rotation of the pedals of the cycle.

The object of my invention is to provide the two mechanisms as separate devices, either of them being constructed as a complete gear adapted for the respective purpose and operation and independent of the other in some respects, so that they may be mounted separately and fixed on the usual right and left hand threads provided on the hub of the rear wheel of a cycle one after the other, and in place of the ordinary sprocket-wheel and the counter-ring therefor. In order to enable and facilitate the said manipulation, the several parts of the driving and braking gears are assembled respectively in such a manner that they form a whole appliance every one, whereby means may be employed which secure the parts to one another, the two gears being besides inclosed in separate parts.

A further object of the invention is to so construct a part of the combined gear that notwithstanding its connecting the driving and the breaking mechanism with one another, so as to produce the control of the one by the other, it permits of the above-described separate mounting and also arresting the movement of the driving means, when the cycle is pushed backward, thereby preventing application of the brake and rotation of the pedals.

In the drawings which form a part of this specification two constructional forms of the mechanism are illustrated by way of example.

Figure 1:
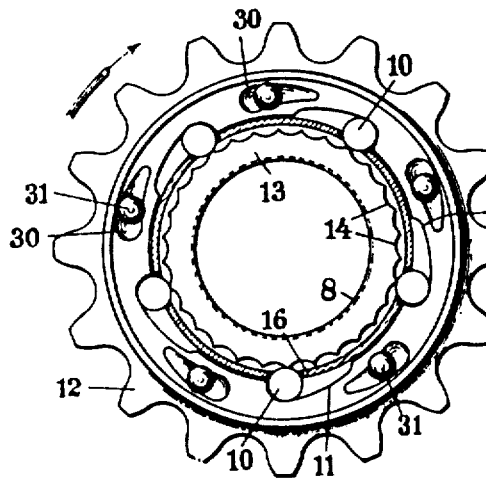
Figure 3:
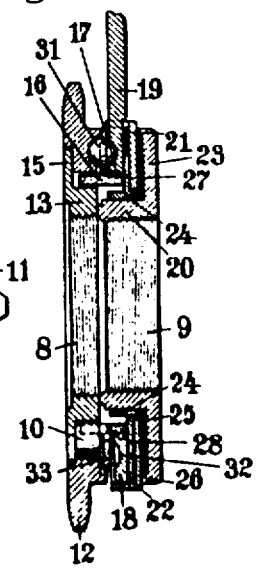
Figure 2:
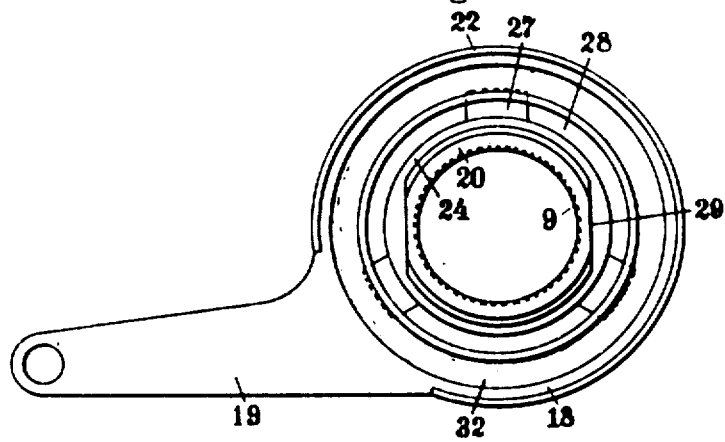

Figure 1 is an elevation of the inner side of the sprocket-wheel and of the free-wheel gear located within the said wheel, the guide ring of the gear being shown in section. Fig. 2 represents in elevation the opposite inner side of the brake, and Fig. 3 shows a vertical transverse section of the entire mechanism along the axis thereof. Figs. 4 to 6 are corresponding views of the second constructional form of the mechanism.

Like numerals designate like parts throughout all figures of the drawing.

Referring firstly to Figs. 1 to 3, the driving and free-wheel clutch comprises a number of rollers 10 arranged in slanting pockets 11 in the inner periphery of the rim of the sprocket-wheel 12. When the sprocket-wheel rotates forwardly the rollers are pressed against the periphery of a ring 13 which may be uniformly smooth, or into recesses 14 provided in the same, the said ring being screwed by means of a right-handed screw-thread 8 on the hub in place of the usual sprocket wheel, as well known in the art. On the side of the ring then facing the spoke-flange of the hub the ring 13 has a flange 15 for guiding the toothed rim 12 and the rollers 10. The latter are uniformly controlled by a guide ring or spacer 16 located between the toothed rim 12 and the ring 13; this guide ring 16 is frictionally held by means of a spring 17 bearing against a brake disk 18 which is to be non-revolubly attached to the frame of the bicycle by means of an arm 19 in the usual manner, so that the rollers 10 are controlled both when the toothed rim rotates forwardly and when the hub rotates backwardly.

The brake comprises two rotating disks and two stationary disks arranged alternately therewith, all the disks being arranged on and guided by a ring 20 screwed on the hub at the side of the ring 13 by means of a left-handed thread 9 in place of the ordinary counter-ring. As mentioned above, one stationary brake disk is the disk 18 whose outer periphery is overlapped by the annular flange 22 of a disk 21. The flange 22 has one or more recesses in which the brake arm 19 and, if desired, other projections of the disk 18 are located, the disk 21 thus being non-revoluble but axially displaceable with respect thereto to a small extent. Obviously, a larger number of rotatable and stationary disks may be provided and in this event several of the stationary disks can engage one another and the brake arm. One rotatable brake disk 23 is provided on the outer ring 20 and rigidly connected therewith, whereas the second rotatable disk 24 is axially displaceable on the ring 20. This can be brought about, for example, by means of flat places or recesses in the ring 20, in which projections 29 provided on the inner periphery of the disk 24 are engaged movably in the axial direction. In order to prevent the rubbing faces seizing or becoming rough, the disk 23 is provided on its inner side with a disk 25 of braking material, such as brass or fiber, attached non-revolubly to it by means of rivets (Fig. 6) or by projections engaging in recesses in its edge 26, similarly to the connection between the disks 18 and 21 (Fig. 3). The part 24 is preferably connected for the same purpose, with a friction disk 28 by, for example, radial lugs 27 engaging in and filling up recesses of the disk 28 of the above mentioned material and preventing the latter rotating, the said lugs extending radially almost through the entire disk. As the middle disks, 21 and 28 are axially displaceable, when the disk 18 is pressed toward the disk 23 all the disks are pressed together and will thereby brake the hub.

On the inner side of the toothed rim 12 between the pockets for the rollers 10 there are cavities 30 which taper in the direction of forward rotation and contain balls 31. On the opposite flat side of the disk 18 is made a shallow annular groove 32 in which the said balls 31 controlled by a guide ring or spacer 33 can move.

The mechanism operates as follows: When the toothed rim 12 rotates forwardly, the rollers 10 are held back by the guide ring 16, checked through the spring 17, and they therefore are firmly clamped between the shallower parts of the pockets 11 and the recesses 14 in the ring 13, whereupon the bicycle is driven. When the toothed rim is held stationary, the ring 13 continues to rotate with the rear wheel and automatically disengages the clutch from the toothed rim, as can easily be understood from the foregoing description. When the bicycle is pushed backward the rollers 10 are held stationary by the guide ring 16 and the spring 17, so that the rear wheel hub together with the ring 13 can rotate backward without operating the driving clutch. If the toothed rim 12 is rotated backwardly by the driver for the purpose of applying the brake, the balls 31 arrive at the shallower parts of the cavities 30 and consequently press the disk 18 toward the disk 23, whereby the brake is applied, as above described. At the same time, the toothed rim is pressed against the flange 15 so that braking also occurs at this place.

The constructional form shown in Figs. 4 to 6 is similar and, in so far as the reference numerals agree with those of the form just described, the individual parts which are employed are the same. Instead of the balls 31, however, ratchet teeth are employed for applying the brake; namely oppositely-directed ratchet teeth 35 and 36 arranged on the guide ring 16' and on a ring 37 located at the side of the toothed rim 12' and carrying the friction spring 17' engage one another, and when the toothed rim 12' rotates backward displace the ring 37 toward the non-displaceable brake disk 23' pressing the stationary brake disk 18' and the disks 25' and 28' located at its two sides on one another, while a braking action is simultaneously caused both between the disk 28' and the disk 37 held stationary and also between the toothed rim 12' and the flange 15'. When the toothed rim 12' rotates forwardly the ring 37 is carried with and driven by the engaged teeth 35 and 36, while the rollers 10' are controlled by the spring 17'. In this form the brake is inclosed by an annular flange 38 of the brake arm and thus protected from the dust.

What I claim as my invention, and desire to secure by Letters Patent, is:

1. In a free-wheel gear and back-pedaling brake, the combination with a driving roller-clutch, of a brake composed of adjacent axially alined rotatable and stationary disks, a spring carried by one of the stationary disks, a member engaging the roller-clutch and frictionally engaged by the spring, and means for moving some of the disks axially to bring all the disks into frictional engagement and thereby apply the brake.

2. In a free-wheel and back-pedaling brake mechanism, the combination with a ring to be screwed upon the hub, of a driving sprocket mounted on said ring, clutch rollers operative therebetween, a spacer ring engaging the said rollers, a brake mechanism also to be screwed on the hub and composed of disks, one of which is adapted to be non-revolubly attached to the cycle frame, a spring carried by the non-revoluble brake member and frictionally engaging the spacer ring, and means for applying the brake mechanism.

3. In a free-wheel gear and back-pedaling brake mechanism, adapted to be employed on a cycle hub, the combination with a driving clutch operative in one direction, of a brake mechanism composed of disks, means for applying the brake mechanism, a member engaging the driving clutch and interposed between the driving and brake mechanisms, and a checking device carried by a stationary part of the brake and engaging the said interposed member.

4. In a combined free-wheel and back-pedaling brake mechanism, the combination with a driving gear, of a brake device, either being arranged on a separate ring to be fixed on the wheel-hub by right and left-hand threads respectively, so as to be mounted on the hub independently, a member interposed between the said driving gear and the brake device and adapted to engage the driving gear, means for applying the brake device, and a checking spring which is in operative contact with the said interposed member and a stationary part of the brake.

5. In a combined free-wheel and back-pedaling brake mechanism, the combination with a driving gear operative in one direction, of a brake composed of rotatable and stationary disks, the gear and brake being adapted to be fixed on the wheel hub separately, a member interposed between the driving gear and brake and engaging the driving gear, means for applying the brake, and a friction spring in operative contact with the said interposed member and a stationary part of the brake.

6. In a combined free-wheel and back-pedaling brake mechanism capable of being fixed on a wheel hub, the combination with a driving device, of a brake composed of stationary and rotatable disks arranged alternately, one of said disks consisting of an outer member having radial recesses and a base ring having lugs engaging said recesses, means for displacing the disks axially to apply the brake, a member interposed between the brake and the driving device and engaging the driving device, and means connected with the brake to retard movement of the interposed member.

7. In a combined free-wheel and back-pedaling brake mechanism adapted to be fixed on the periphery of a cycle-hub by means of separate base rings, the combination with a driving gear, of a brake composed of rotatable and stationary disks one of which is adapted to be rigidly attached to the cycle frame, while others are axially displaceable, the rotatable disks being in angular engagement with the respective base ring, means for applying the brake, and a member engaging the driving gear and interposed between the said gear and a stationary part of the brake.

8. In a combined free-wheel and back-pedaling brake mechanism, capable of being fixed on the periphery of a cycle hub by means of separate base rings, the combination with a driving gear comprising one base ring and a sprocket carried by said base ring, of a brake constructed upon the other base ring and composed of rotatable and stationary disks adapted to be pressed together, an arm connecting the stationary brake disks with the cycle frame, a brake-applying gear connected with the driving gear and bearing against the brake to receive the reactive pressure of the brake and produce a braking effect between the sprocket and base ring of the driving gear when said gear is held stationary, and a member engaging the driving gear and interposed between the said driving gear and a stationary part of the brake.

In testimony whereof I have signed my name to this specification in presence of two subscribing witnesses.

ERNST SACHS.

Witnesses:
OLGA HINZE,
CURT WAGNER.